(12) United States Patent
Chien et al.

(10) Patent No.: US 10,859,841 B2
(45) Date of Patent: Dec. 8, 2020

(54) AUGMENTED REALITY IMAGE DEVICE

(71) Applicant: METAL INDUSTRIES RESEARCH & DEVELOPMENT CENTRE, Kaohsiung (TW)

(72) Inventors: Jui-Ting Chien, Kaohsiung (TW); Sheng-Hsiu Tseng, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 129 days.

(21) Appl. No.: 16/224,766

(22) Filed: Dec. 18, 2018

(65) Prior Publication Data
US 2020/0192104 A1 Jun. 18, 2020

(51) Int. Cl.
*G02B 27/14* (2006.01)
*G02B 27/01* (2006.01)

(52) U.S. Cl.
CPC ..... *G02B 27/0176* (2013.01); *G02B 27/0172* (2013.01); *G02B 2027/015* (2013.01); *G02B 2027/0134* (2013.01)

(58) Field of Classification Search
CPC ................................. G02B 27/0176
USPC .......................................... 359/631
See application file for complete search history.

(56) References Cited

U.S. PATENT DOCUMENTS

2015/0370074 A1* 12/2015 McDowall ........... G02B 5/3025
349/11

FOREIGN PATENT DOCUMENTS

| CN | 205982823 U | 2/2017 |
| CN | 107111139 A | 8/2017 |
| CN | 207408689 U | 5/2018 |

* cited by examiner

*Primary Examiner* — James C. Jones
(74) *Attorney, Agent, or Firm* — CKC & Partners Co., LLC

(57) ABSTRACT

An augmented reality image device is provided and includes a display, a mirror, a reflector, and a front mask. The display has a first side and a second side opposite to the first side. The mirror and the front mask are disposed at the first side of the display. The first reflector is disposed at the second side of the display. The front mask has a reflection area. The display emits an image light from the first side to the mirror. The image light is reflected by the mirror to the reflector. The reflector reflects the image light to the reflection area of the front mask. Therefore, a virtual image caused by the image light in the reflection area is combined with a real image to generate an augmented reality image.

9 Claims, 3 Drawing Sheets

AUGMENTED REALITY IMAGE DEVICE

BACKGROUND

Field of Invention

The present invention relates to an augmented reality image device for generating a virtual image so that a user can see the virtual image with a real image through the augmented reality image device.

Description of Related Art

In recent years, augmented reality (AR) devices have received lots of attention, and major companies have launched AR platforms. For example, Apple Inc. has released ARkit application interface in 2017. However, existing AR devices are often too heavy or too large. How to design a lighter augmented reality device is a topic of concern to those skilled in the art.

SUMMARY

Embodiments of the invention provide an augmented reality image device including a display having a first side and a second side opposite to the first side; a mirror disposed at the first side of the display; at least one reflector disposed at the second side of the display; and a front mask disposed at the first side of the display, in which the front mask has a reflection area. The display emits image light from the first side to the mirror, the image light is reflected by the mirror to the reflector, and the reflector reflects the image light to the reflection area of the front mask. Accordingly a virtual image caused by the image light in the reflection area is combined with a real image to generate an augmented reality image.

In some embodiments, the front mask has a reflecting layer including coating films with different refractive index. An average reflectance of the reflecting layer for unpolarized light with wavelength in a range from 400 nm to 700 nm is greater than 50%.

In some embodiments, the reflector includes a first reflector and a second reflector. The image light includes left-eye image light and right-eye image light. The left-eye image light is reflected by the mirror to the first reflector, and the right-eye image light is reflected by the mirror to the second reflector.

In some embodiments, the reflection area of the front mask includes a left-eye reflection area and a right-eye reflection area. The first reflector reflects the left-eye image light to the left-eye reflection area, and the second reflector reflects the right-eye image light to the right-eye reflection area.

In some embodiments, the left-eye image light and the right-eye image light is focused at a distance from a side of the front mask opposite to the display.

In some embodiments, the distance is substantially one meter.

In some embodiments, there is a disparity between content of the left-eye image light and content of the right-eye image light such that the virtual image has a three-dimensional object.

In some embodiments, the display has a display surface for emitting the image light. An angle between the display surface and a surface of the front mask is less than or equal to 45 degrees.

In some embodiments, the mirror is disposed between the display and the front mask. An angle between the mirror and a surface of the front mask is less than or equal to 45 degrees.

In some embodiments, the augmented reality image device further includes a support against a noise of a user, in which the reflector is integrated to the support.

BRIEF DESCRIPTION OF THE DRAWINGS

The invention can be more fully understood by reading the following detailed description of the embodiment, with reference made to the accompanying drawings as follows.

DETAILED DESCRIPTION

The using of "first", "second", "third", etc. in the specification should be understood for identifying units or data described by the same terminology, but are not referred to particular order or sequence.

Figure 1:
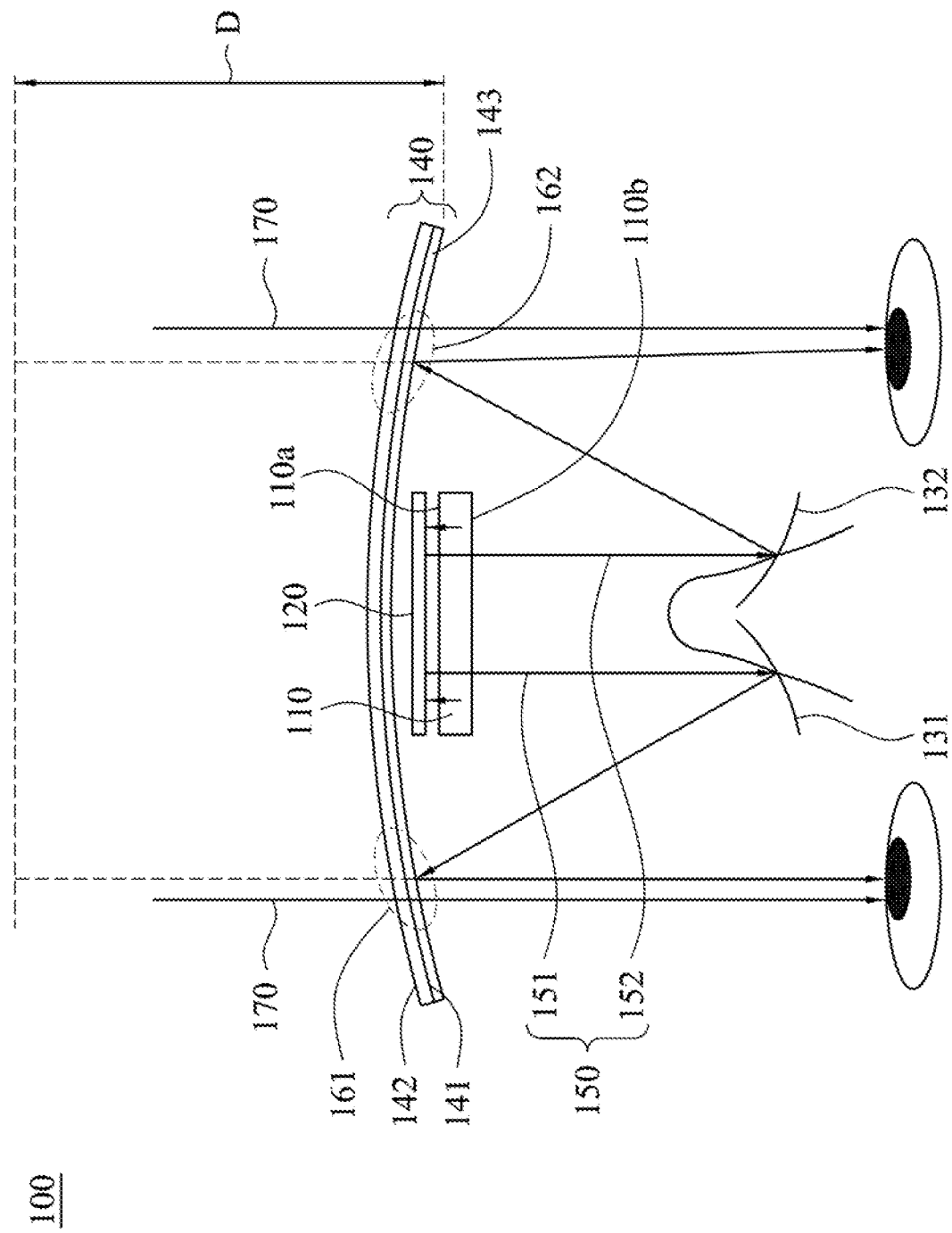
FIG. 1 is a schematic top view of an augmented reality image device in accordance with an embodiment.

FIG. 1 is a schematic top view of an augmented reality image device in accordance with an embodiment. Referring to FIG. 1, an augmented reality image device 100 includes a display 110, a mirror 120, a first reflector 131, a second reflector 132, and a front mask 140. The display 110 may be an organic light-emitting diode (OLEO) display, a liquid crystal display or other devices capable of providing image light. The mirror 120, the first reflector 131, and the second reflector 132 may include glass, reflective coating, or other films and units that reflect light. The front mask 140 is at the front of the user. The material of the front mask 140 may include glass, resin or, polycarbonate. The augmented reality image device 100 is implemented based on a snow mask in some embodiments, but the augmented reality image device 100 may have any appearance in other embodiments. The size, shape, and material of the augmented reality image device 100 are not limited in the invention.

The display 110 has a first side 110a and a second side 110b opposite to the first side 110a. The mirror 120 and the front mask 140 are disposed at the first side 110a. The mirror 120 is disposed between the display 110 and the front mask 140. On the other hand, the first reflector 131 and the second reflector 132 are disposed at the second side 110b. The display 110 emits image light 150 which includes left-eye image light 151 and right-eye image light 152 in some embodiments. Note that the left-eye image light 151 and the right-eye image light 152 are emitted by the same display 110 instead of two independent displays that are used in prior art. Accordingly, the augmented reality image device 100 has an advantage of lighter weight.

The left-eye image light 151 and the right-eye image light 152 is emitted to the mirror 120 which reflects the left-eye image light 151 and the right-eye image light 152 to the first reflector 131 and the second reflector 132 respectively. The first reflector 131 and the second reflector 132 reflects the image light 150 to the front mask 140 which projects part of the image light 150 into the user's eyes so that user can see a virtual image. In addition, light 170 from outside of the front mask 140 is emitted into the eyes, and thus the user also sees a real image which is combined with the virtual image to produce an augmented reality image.

In detail, the front mask 140 has a first surface 141 and a second surface 142 opposite to the first surface 141 which faces the display 110. A reflecting layer 143 is disposed on the first surface 141. The reflecting layer 143 includes multiple coating films with different refractive index where the coating films with high refractive index and the coating films with low refractive are disposed alternatively. An average reflectance of the reflecting layer 143 with respect to unpolarized light having wavelength in a range from 400 nm to 700 nm is greater than 50% because the wavelength of 400 nm to 700 nm is visible light, and the image rendered on the reflecting layer 143 may not be clear if the reflectance of the reflecting layer 143 is too low. The reflecting layer 143 has a first reflection area 161 and a second reflection area 162. The first reflector 131 reflects the left-eye image light 151 to the left-eye reflection area 161 which projects part of the left-eye image light 151 into the left eye of the user. In addition, the second reflector 132 reflects the right-eye image light 152 to the right-eye reflection area 162 which projects part of the right-eye image light 152 into the right eye of the user. Note that left-eye reflection area 161 and the right-eye reflection area 162 are just exemplary. The sizes, shapes, and locations of the left-eye reflection area 161 and the right-eye reflection area 162 are not limited in the invention. In some embodiments, the left-eye reflection area 161 and the right-eye reflection area 162 are connected to the each other.

In some embodiments, the left-eye image light 151 and the right-eye image light 152 is focused at a distance D from a side of the front mask 140 opposite to the display 110 through focus adjustment. In other words, the user would "see" the virtual image at the distance D. In prior art, the image light 150 is focused at the reflecting layer 143 which is too close to the eyes, and thus the user may quickly feel the visual fatigue. In contrast, the virtual image is focused at the distance D, and therefore the visual fatigue is reduced. The distance D is substantially 1 meter (with error within 20%). In other embodiments, the distance D may also be 80 centimeters, 2 meters or any other values. In some embodiments, there is a disparity between the content of the left-eye image light 151 and the content of the right-eye image light 152 such that the virtual image has three-dimensional object.

Figure 2:
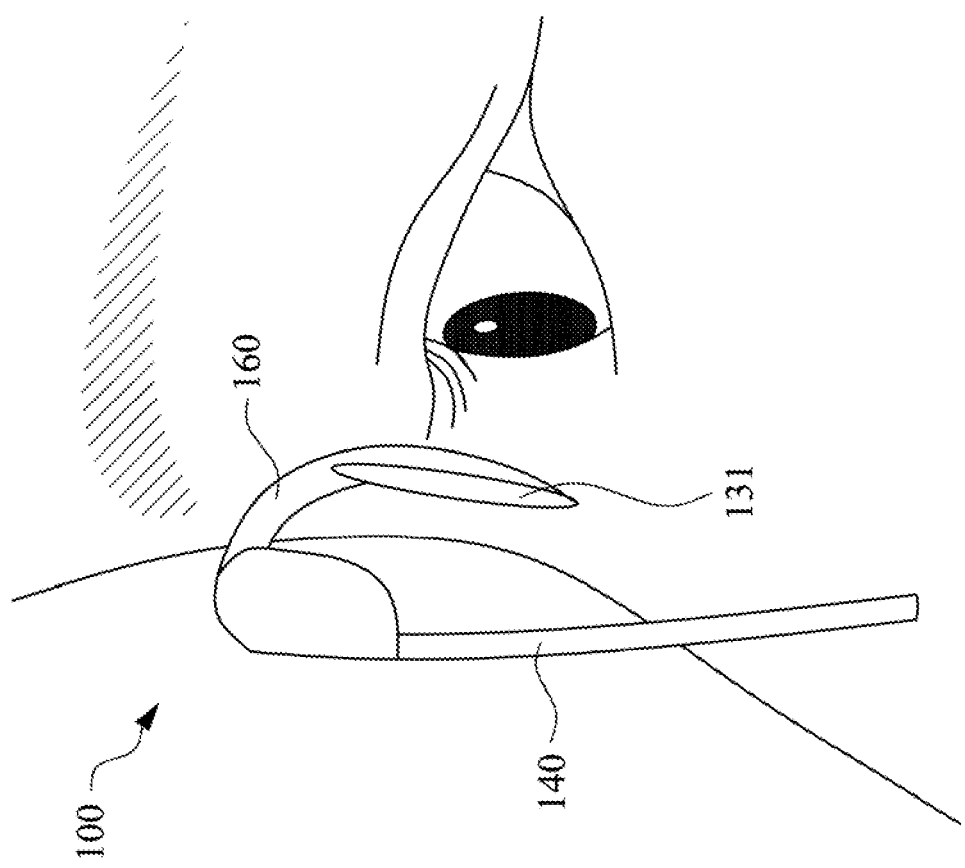
FIG. 2 is a schematic side view of the augmented reality image device in accordance with an embodiment.

FIG. 2 is a schematic side view of the augmented reality image device in accordance with an embodiment. Referring to FIG. 1 and FIG. 2, the augmented reality image device 100 also includes a support 160 in some embodiments. The support 160 is against the nose of the user, and the first reflector 131 is integrated to the support 160. For example, the first reflector 131 locates above the bridge of the nose. Note that FIG. 2 is a side view, and therefore only the first reflector 131 is illustrated. However, the second reflector 132 (not shown in FIG. 2) is disposed on another support at the other side of the nose. There are two reflectors 131 and 132 in this embodiment, but in some embodiments, the device includes only one reflector at either side of the nose. In that case, the display 110 emits only one ray, instead of two, of the image light, which is not limited in the invention.

Figure 3:
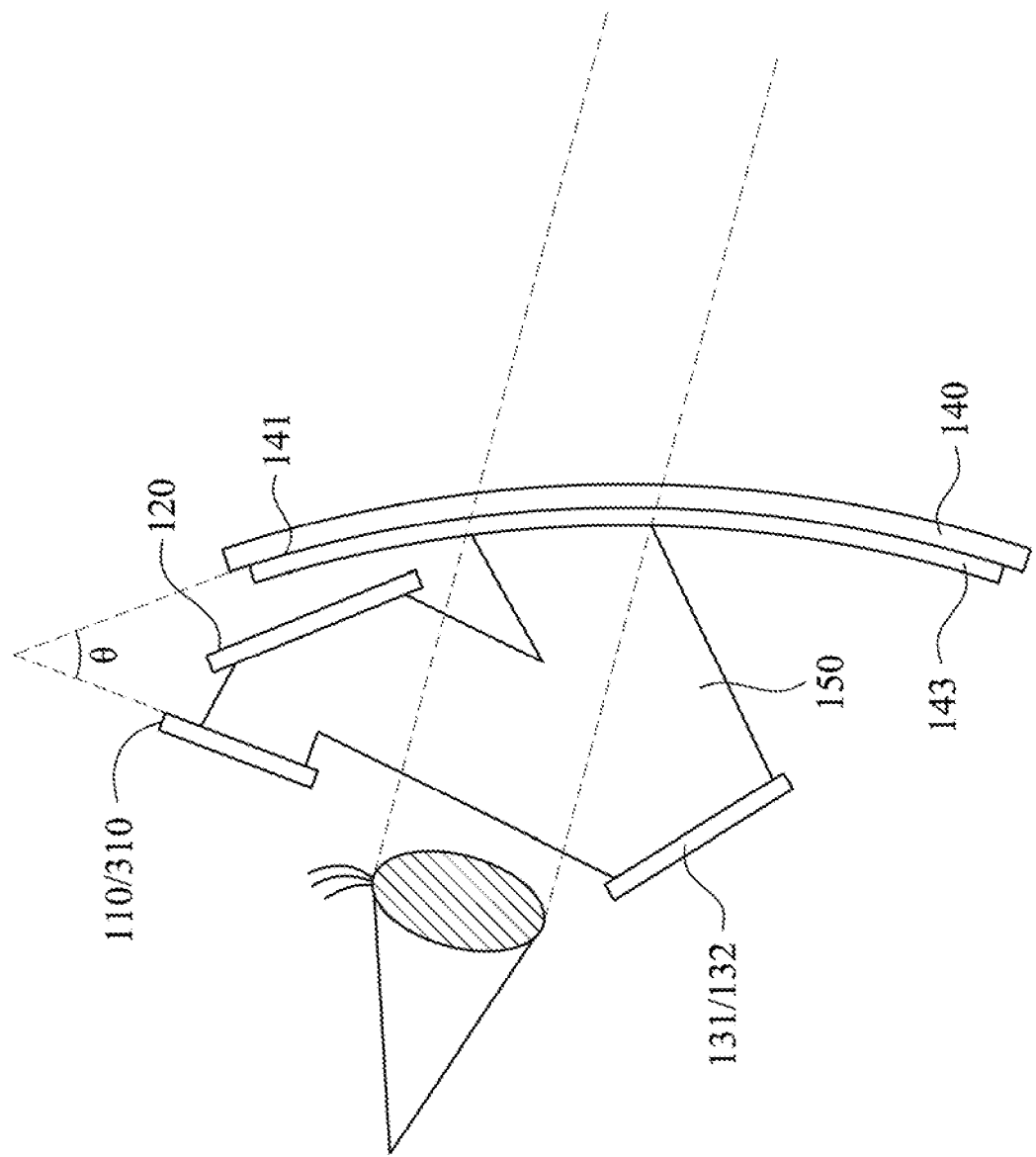
FIG. 3 is a schematic side view of the augmented reality image device for illustrating a light path in accordance with an embodiment.

FIG. 3 is a schematic side view of the augmented reality image device for illustrating a light path in accordance with an embodiment. Referring to FIG. 3, the image light 150 is emitted by the display 110 to the mirror 120. The mirror 120 reflects the image light 150 to the first reflector 131 and the second reflector 132. The image light is reflected by the first reflector 131 and the second reflector 132 to the reflection areas of the front mask 140. In the embodiment, the display 110 and the mirror 120 are approximately vertical oriented, and thus the horizontal thickness of the augmented reality image device 100 is reduced. To be specific, the display 110 has a display surface 310 for emitting the image light 150. An angle θ between the display surface 310 and the first surface 141 of the front mask is less than or equal to 45 degrees. In addition, an angle between the mirror 120 and the first surface 141 is also less than or equal to 45 degrees.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. An augmented reality image device comprising:
a display having a first side and a second side opposite to the first side;
a mirror disposed at the first side of the display;
at least one reflector disposed at the second side of the display; and
a front mask disposed at the first side of the display, wherein the front mask has a reflection area,
wherein the display emits image light from the first side to the mirror, the image light is reflected by the mirror to the at least one reflector, and the at least one reflector reflects the image light to the reflection area of the front mask, such that a virtual image caused by the image light in the reflection area is combined with a real image to generate an augmented reality image,
wherein the at least one reflector comprises a first reflector and a second reflector, the image light comprises left-eye image light and right-eye image light, the left-eye image light is reflected by the mirror to the first reflector, and the right-eye image light is reflected by the mirror to the second reflector.

2. The augmented reality image device of claim 1, wherein the front mask has a reflecting layer comprising a plurality of coating films with different refractive index, and an average reflectance of the reflecting layer for unpolarized light with wavelength in a range from 400 nm to 700 nm is greater than 50%.

3. The augmented reality image device of claim 1, wherein the reflection area of the front mask comprises a left-eye reflection area and a right-eye reflection area, the first reflector reflects the left-eye image light to the left-eye reflection area, and the second reflector reflects the right-eye image light to the right-eye reflection area.

4. The augmented reality image device of claim 3, wherein the left-eye image light and the right-eye image light is focused at a distance from a side of the front mask opposite to the display.

5. The augmented reality image device of claim 4, wherein the distance is substantially one meter.

6. The augmented reality image device of claim 3, wherein there is a disparity between content of the left-eye image light and content of the right-eye image light such that the virtual image has a three-dimensional object.

7. The augmented reality image device of claim 1, wherein the display has a display surface for emitting the image light, and an angle between the display surface and a surface of the front mask is less than or equal to 45 degrees.

8. The augmented reality image device of claim 1, wherein the mirror is disposed between the display and the front mask, and an angle between the mirror and a surface of the front mask is less than or equal to 45 degrees.

9. The augmented reality image device of claim 1, further comprising:
    a support against a nose of a user, wherein the at least one reflector is integrated to the support.

\* \* \* \* \*